May 13, 1947.  D. H. MITCHELL  2,420,609
TRANSLATING CIRCUIT AND APPARATUS FOR PORTABLE ELECTRICAL DEVICES
Filed April 19, 1943  3 Sheets-Sheet 3
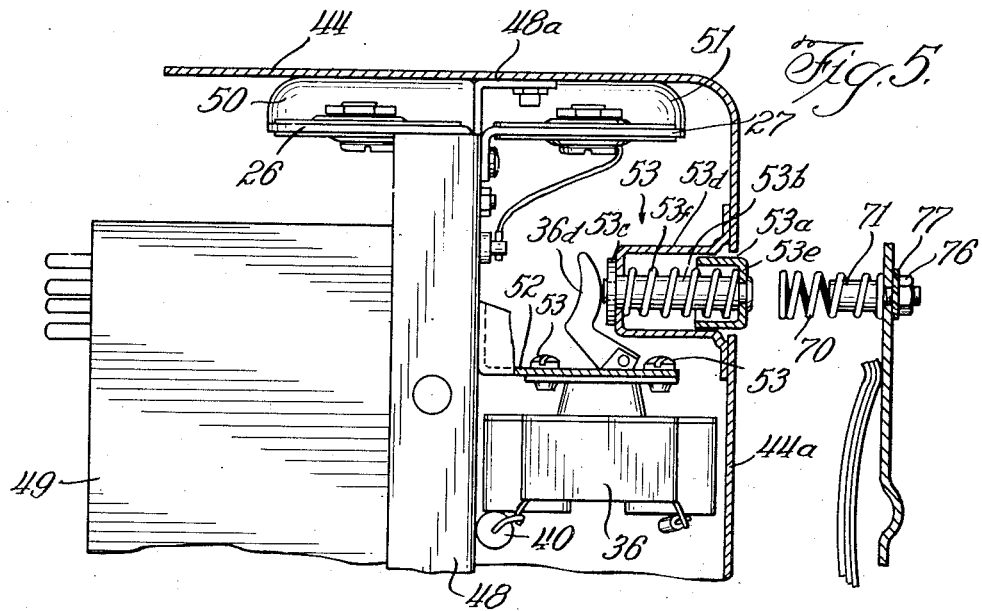
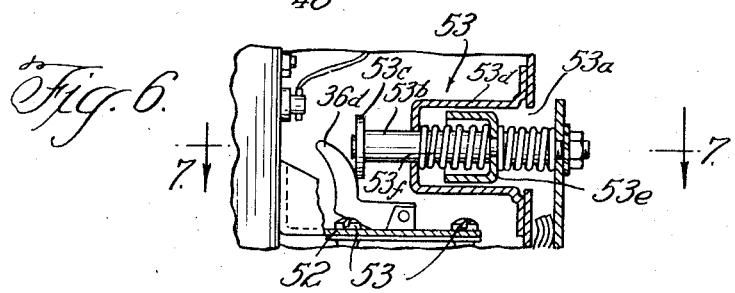
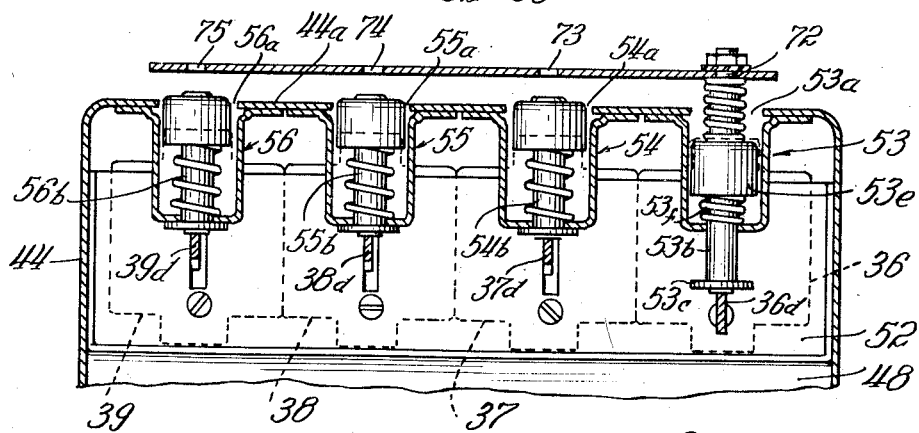
Inventor:
Donald H. Mitchell
By: Foorman L. Mueller, Atty.

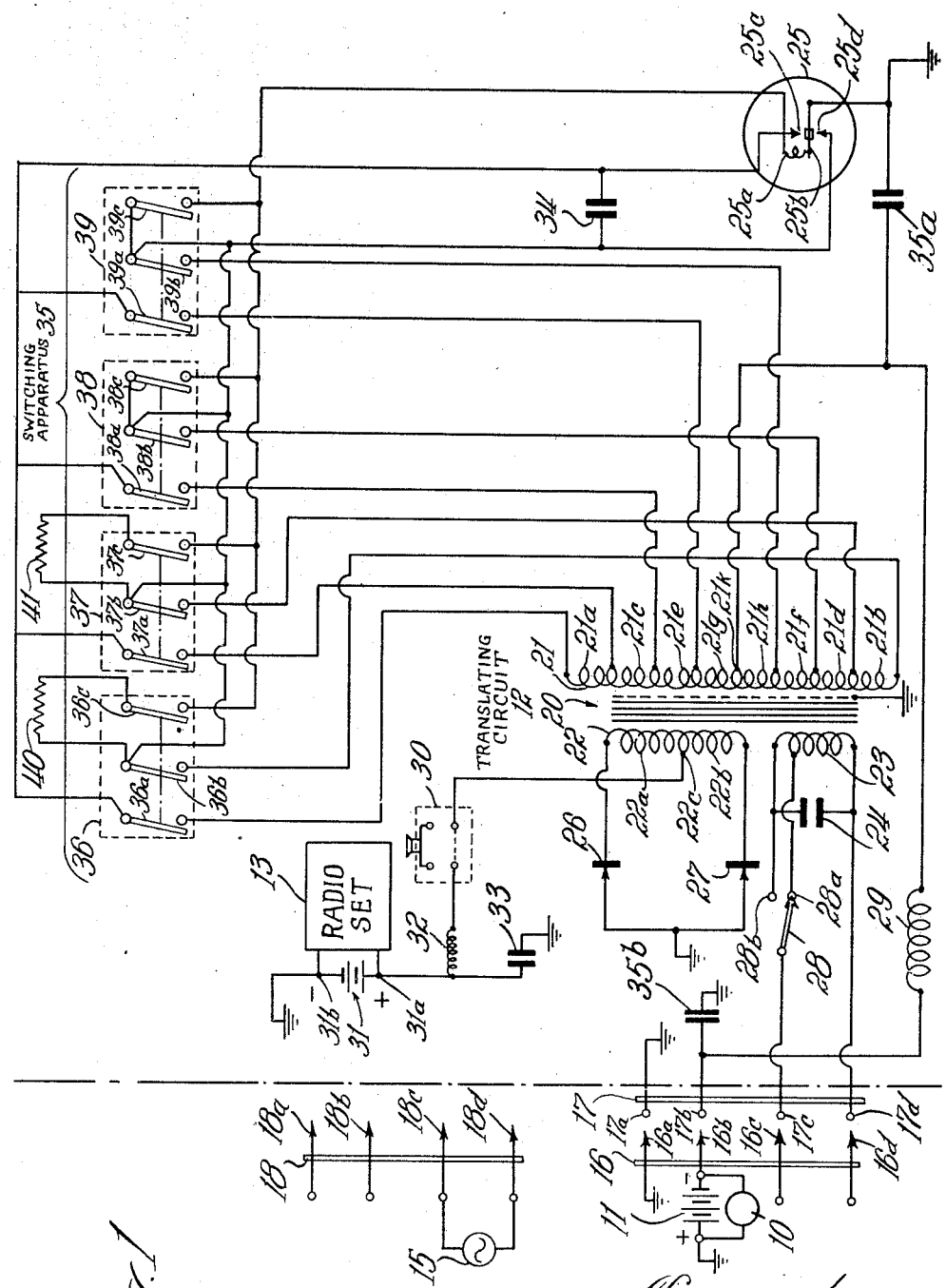

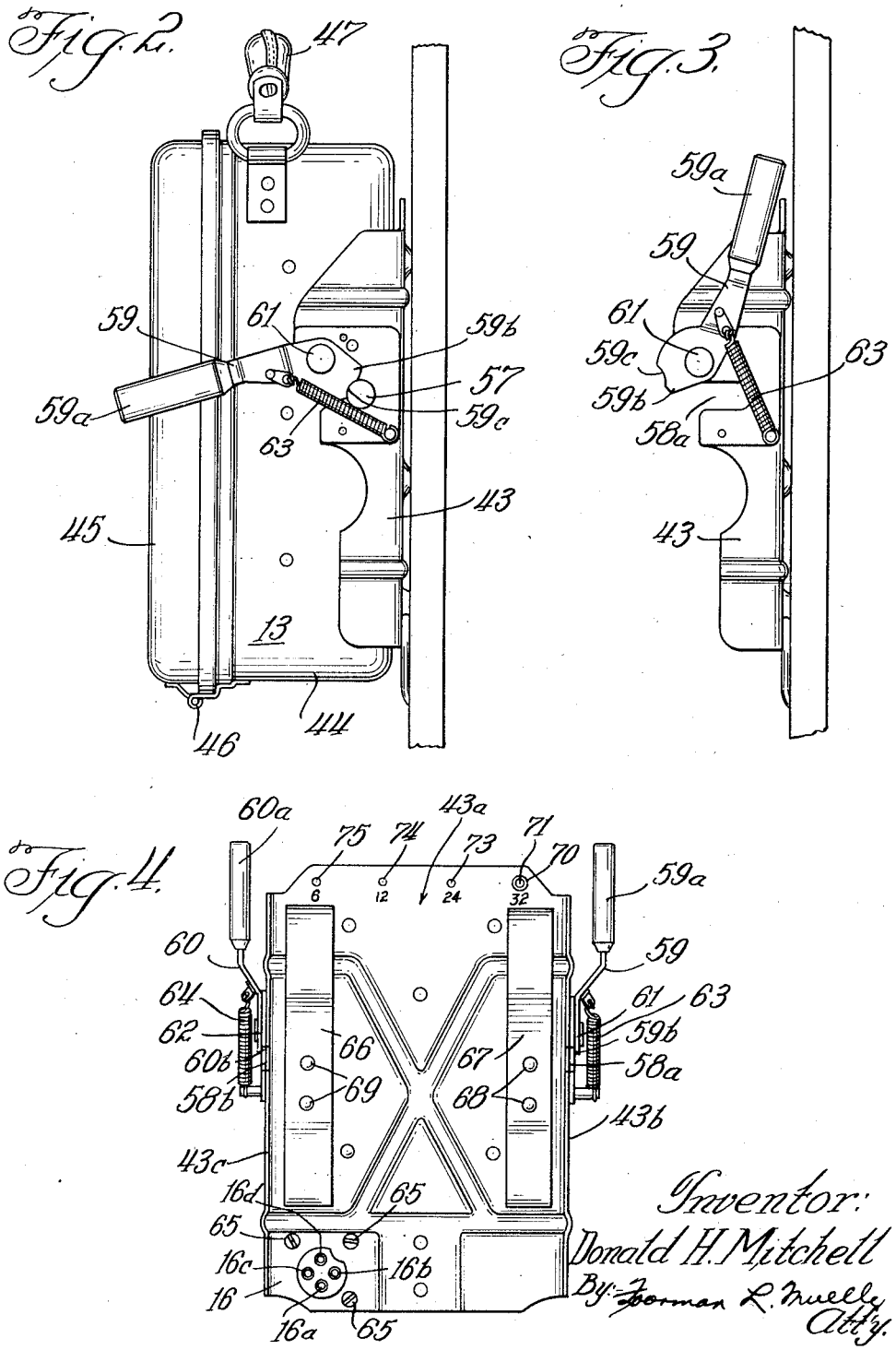

Patented May 13, 1947

2,420,609

UNITED STATES PATENT OFFICE 2,420,609

TRANSLATING CIRCUIT AND APPARATUS FOR PORTABLE ELECTRICAL DEVICES

Donald H. Mitchell, Chicago, Ill., assignor to Galvin Manufacturing Corporation, Chicago, Ill., a corporation of Illinois Application April 19, 1943, Serial No. 483,672

10 Claims. (Cl. 320—56)

1

The present invention relates to portable electrical devices and supporting structures therefor, and more particularly to improved apparatus for selectively controlling the translating circuit of a portable electrical device in order automatically to adapt the circuit for energization from current sources of different characteristics incident to the mounting of the device upon supporting brackets having the current sources of different characteristics respectively associated therewith.

In many applications it is desirable to supply direct current at a fixed voltage and polarity to the energy consuming element or elements of a portable electrical device from different current sources of different characteristics. Thus, in military and police communication work, for example, portable radio sets are used, which are equipped with low voltage storage batteries that are utilized to supply current to the energy consuming elements thereof. It is now common practice to charge the batteries of such sets from the storage batteries or current distribution systems of automotive vehicles. As between vehicles of different types, the charging or current distribution systems may be designed to operate at different voltages. This, of course, means that the charging or translating circuit with which a portable radio set is equipped must be so arranged that it is capable of producing an output voltage of the value and polarity required to charge the battery of the set when energized from any one of a plurality of current sources having different voltages. It is also desirable to equip such portable radio sets so that the battery charging circuits thereof may be energized from any convenient source of alternating current. Moreover, the charging facilities as provided in portable radio sets should be so related to the equipment of the vehicles at which they may be charged, that the required charging connections may be established with a minimum number of simple operations requiring no theoretical knowledge on the part of the person setting up the connections.

It is an object of the present invention, therefore, to provide an improved translating circuit for a portable electrical device.

According to another object of the invention, the circuit may be selectively controlled to produce an output voltage having a predetermined value and a predetermined polarity when energized from any one of a number of direct current sources of different voltages and polarities or from an alternating current source.

2

In accordance with still another object of the invention, the translating circuit is automatically and selectively controlled to be energized from direct current sources of different voltages incident to the positioning of the device in which the circuit is provided upon supporting brackets respectively associated with the different sources of current.

It is a further object of the present invention to provide an improved and exceedingly simple switching arrangement for selectively controlling the translating circuit of a portable electrical device in accordance with the particular voltage of the current source to which the circuit is connected, incident to the positioning of the device upon a supporting bracket or structure associated with the current source.

According to still another object of the invention, an improved and exceedingly simple supporting structure is provided for rigidly supporting a portable electrical device, which structure is equipped with facilities for selectively controlling the translating circuit of any portable device supported thereon.

It is another object of the invention to provide a new and improved translating circuit for converting a direct or alternating voltage derived from current sources of different voltages into a direct voltage having a predetermined fixed value and polarity regardless of the character or polarity of the source from which the circuit is energized.

It is a further and more specific object of the present invention to provide an improved and exceedingly simple arrangement for charging the storage battery of a portable radio set from direct current sources of indiscriminate voltages and indeterminate polarities.

The invention, both as to its organization and method of operation, together with further objects and advantages thereof, will best be understood by reference to the following specification taken in connection with the accompanying drawings, in which:

Fig. 1 is a diagrammatic illustration of a complete translating circuit characterized by the features of the present invention, and including an energizing source of direct current, an energizing source of alternating current, and a radio set including a storage battery;

Fig. 2 is a side view illustrating a complete portable transmitter and receiver set equipped with the translating circuit illustrated in Fig. 1, and also illustrating the present improved structure for supporting the set when the storage battery thereof is to be charged;

Fig. 3 is a side view illustrating the supporting structure or bracket shown in Fig. 2 with the clamping levers thereof moved to their respective retracted or normal positions;

Fig. 4 is a face view of the supporting bracket shown in Figs. 2 and 3;

Fig. 5 is a fragmentary sectional view illustrating the functional relationship between the switching means forming a part of the radio set and the switch actuating assembly carried by the supporting bracket;

Fig. 6 is a fragmentary sectional view illustrating the parts shown in Fig. 5 when these parts are actuated or engaged; and Fig. 7 is a fragmentary sectional view taken along the line 7—7 of Fig. 6 illustrating the switching apparatus which is provided in the set to control the translating circuit thereof.

Referring now more particularly to Fig. 1 of the drawings, the system there illustrated comprises a direct current generator 10, a storage battery 11, a translating circuit 12 and the storage battery 31 of a portable radio set 13, arranged to be connected in tandem in the order named. The parallel connected generator 10 and storage battery 11 may be arranged to supply current to the distribution system of an automobile or other vehicle, which system may include the usual current consuming devices, such, for example, as lamps, a fan motor and the engine driving motor of the starting facilities. The respective positive terminals of the generator 10 and battery 11 are both connected to the frame of the vehicle as indicated by the conventional positive polarity marking shown in the drawings. The conductors for delivering current to the translating circuit 12 from the energizing sources 10 and 11 respectively terminate at terminal contacts 16a and 16b of a female connector 16 which may be mounted upon a supporting structure or bracket of the character illustrated in Figs. 2 to 7, inclusive, of the drawings in the manner more fully pointed out below.

As indicated above, the voltage appearing across the parallel connected current sources 10 and 11 may be any one of a number of different values depending upon the character of the vehicle in which these sources are provided. For example, the voltage of these sources as measured between the terminals 16a and 16b of the connector 16 may be six volts, twelve volts, twenty-four volts, or thirty-two volts, depending upon the particular type and character of the vehicle in which they are provided. In order fully to explain the mode of operation of the translating circuit 12, the system is further illustrated as comprising a source of alternating current 15 having terminals which are connected to the terminal contacts 18c and 18d of a female connector 18. As will be pointed out below, only the "a" and "b" terminal contacts or the "c" and "d" terminal contacts of any one plug are connected to an associated current source. It will be understood, therefore, that in actual practice the two sets of contacts of each bracket connector are used alternatively and that both sets of contacts of the same connector are never wired to different current sources.

All parts of the translating circuit 12 of the radio set 13, including the storage battery 31 and the contacts of the male connector 17, are mounted within the housing for the radio set 13 in the manner explained below. It will be understood in this regard that the contacts 17a, 17b, 17c and 17d of the connector 17 are adapted to be inserted in the terminal contacts 16a, 16b, 16c and 16d, respectively, of the connector 16, or the terminal contacts 18a, 18b, 18c and 18d, respectively, of the connector 18. Briefly considered, the translating circuit 12 comprises a converter for transforming a direct voltage applied to the connector terminals 17a and 17b, for example, into an alternating voltage of a desired value, and a full wave rectifier circuit for reconverting the alternating voltage into a direct voltage which is impressed across the terminals of the chargeable storage battery 31. The converter is of the electro-mechanical type and includes an inductive coupling device in the form of a transformer 20 having a secondary winding 22 included in the rectifier circuit, a tapped primary winding 21, and a buffer or tertiary winding 23 which is shunted by a buffer condenser 24 to resonate at a frequency substantially equal to that of the voltage induced in the secondary winding 22 during operation of the converter. This tertiary winding is also utilized in a circuit including the contacts of a manually operable tap changing switch 28 for energizing the rectifier circuit from a source of alternating current, such for example, as the source 15, bridged across the contacts 18c and 18d of the bracket connector 18. For the purpose of selectively conditioning the translating circuit 12 for energization from any one of a plurality of direct current sources of different voltages, switching means or apparatus indicated generally at 35 and comprising the four switches 36, 37, 38, and 39 is provided. This apparatus has a plurality of settings individually corresponding to the different voltages of the current sources from which the translating circuit, and more particularly the primary winding 21 of the transformer 20, may be energized. It has the function of selectively including different sections of the transformer winding 21 in the available circuits for energizing this winding from an associated source of direct current. In the illustrated arrangement, the switching apparatus 35 is provided with four different settings wherein the switches 36, 37, 38 and 39 are respectively operated, and with an additional setting wherein none of the four enumerated switches is operated. For the purpose of alternately energizing the encircuited upper and lower sections of the primary winding 21, i. e., those encircuited sections of this winding which are disposed on opposite sides of the center tap 21k, a control device in the form of a vibratory relay 25 is provided. This relay includes a weighted armature 25b which carries contacts arranged alternately to engage the stationary contacts 25c and 25d, respectively included in the circuits for energizing the upper and lower encircuited sections of the primary winding 21. The relay 25 further comprises a driving magnet 25a which, when energized, functions to attract the weighted armature 25b so that one of the contacts carried thereby engages the stationary contact 25d.

The converter further comprises a suitable filter network which is inserted in the path connecting the connector terminal 17b with the center tap 21k of the winding 21, and includes a series choke 23 and a pair of shunt condensers 35a and 35b. A suitable condenser 34 is connected across the stationary contacts 25c and 25d of the relay 25 in order to improve the wave form of the voltage induced in the secondary winding 22 during operation of the circuit. For the purpose of increasing the impedance of the available circuit for energizing the operating winding 25a of the relay 25 when the translating circuit 12 is connected to be energized from current sources of relatively high and different voltages, current limiting resistors 40 and 41 are respectively associated with the two switches 36 and 37.

The full wave rectifier circuit, through which the alternating voltage induced in the transformer secondary winding 22 is converted into a direct voltage and impressed across the terminals of the battery 31, comprises two rectifier elements 26 and 27, which may be of the copper oxide type, for example, connected in series across the outer terminals of the secondary winding 22 and provided with a connection to the negative terminal of the battery 31 at the junction point therebetween. It is noted that the directions of the arrows in the symbols illustrating the rectifiers 26 and 27 conventionally indicate the respective directions in which current may be passed through these elements, rather than the directions of electron flow therethrough. The rectifier circuit is completed by providing a connection between the center tap 22c of the secondary winding 22 and the positive terminal of the battery 31 which connection has serially included therein a filter choke 32 and the contacts of a thermal trip switch 30. The filtering action of the choke 32 is supplemented by a smoothing condenser 33 which is bridged across the terminals of the battery 31 and the output terminals of the translating circuit.

It is noted that the switch 30 is provided to prevent the battery 31 from being discharged through the rectifier circuit in the event it is reversely connected to the terminals 31a and 31b during the assembly of the battery within the housing of the set. In this regard it is pointed out that the battery 31 is detachably connectable to the remaining circuit elements of the set at the contacts 31a and 31b. Moreover, if the battery is reversely connected to these terminals, a heavy discharge current is produced thereby which traverses the two rectifier elements in parallel, the two halves of the winding 22, the actuating winding or resistor of the switch 30, the contacts of the switch and the choke coil 32. This current is sufficient to trip the switch 30 in the usual manner, thereby to open the circuit and thus interrupt the flow of discharge current from the battery 31. After the correct connections have been established between the terminals of the battery and the contacts 31a and 31b, the switch 30 may be manually reset to recomplete the rectifying circuit.

As indicated above, the translating circuit 12 may be embodied in a combined portable radio transmitter and receiver set of the character illustrated in Figs. 2, 5, 6 and 7 of the drawings. Briefly considered, this set which is indicated generally at 13 and is adapted to be mounted upon any one of a plurality of supporting brackets 43, in the manner explained below, comprises an outer housing or casing 44 having an open side which is normally closed by a cover 45 axis mounted at 46 upon one end of the housing 44. A carrying handle 47 suitably mounted upon the opposite end of the housing 44 in the manner illustrated in Fig. 2 of the drawings is provided in order that the set may be carried about as a luggage unit. All parts of the radio set 13, including the elements of the translating circuit 12, are suitably mounted within the chamber defined by the walls of the housing 44 and the cover 45. More specifically, and as best shown in Fig. 5 of the drawings, a sub-panel 48 suitably mounted within the housing 44 is provided for at least partially separating the interior of the housing into two compartments. All circuit elements of the radio set 13 are mounted upon a chassis unit 49, which is detachably mounted upon the sub-panel 48. For the most part, the circuit elements of the translating circuit 12 are supported within the compartment defined between the sub-panel 48 and the bottom wall 44a of the housing 44. In this regard it is pointed out that all circuit terminals identified in Fig. 1 of the drawings to the right of the broken line by the conventional ground symbols, are electrically connected to the chassis 49 and the sub-panel 48 of the set. The batteries, including the battery 31, for supplying current to the energy consuming devices carried by the chassis unit 49 and forming a part of the set 13 may also be disposed within the compartment defined between the sub-panel 48 and the bottom wall 44a of the housing. More specifically to consider certain of the circuit elements provided in the translating circuit 12, it will be noted that the copper oxide rectifying elements 26 and 27 are respectively mounted upon bracket pieces 50 and 51 which in turn are rigidly supported upon the sub-panel 48. The switches 36 to 39, inclusive, are likewise mounted upon a bracket piece 52 which is rigidly secured to the underside of the sub-panel 48. Thus, the switch 36 is illustrated as being mounted upon the bracket piece 52 by means of the mounting screws 53. This switch carries its associated current limiting resistor 40 and is provided with an actuating arm 36d which extends through an enlarged opening cut in the supporting wall of the bracket piece 52. The three other switches 37, 38 and 39 are, as best shown in Fig. 7 of the drawings, likewise provided with actuating arms 37d, 38d and 39d, respectively, which extend through enlarged openings provided in the supporting wall of the bracket piece 52. These switch actuating arms are arranged respectively to be engaged by the actuating plungers of four switch actuating assemblies 53, 54, 55, and 56. The four switch actuating assemblies, which are arranged respectively to be actuated through corresponding openings 53a, 54a, 55a and 56a provided in the bottom wall 44a of the housing 44, are of identical structure and arrangement. Considering the assembly 53 by way of example, this assembly is illustrated as comprising a wall member 53d the portions of which define a well within which the other parts of the assembly are supported, and inclose the inner side of the opening 53a through the wall 44a. The assembly further comprises an operating plunger 53b, which is guidably supported within an opening located at the inner end of the wall member 53d for reciprocating movement longitudinally thereof. At its outer end, the plunger 53b rigidly supports a closure cup 53e which fits within the well defined by the wall member 53d and extends partially through the opening 53a. The inner end of the plunger 53b is arranged to engage the actuating arm 36d of the switch 36. For the purpose of biasing the plunger 53b in a direction such that the arm 36d normally occupies in its unoperated position, a biasing spring 53f is provided within the well defined by the member 53d. This spring is anchored at one end within the cup 53e and at its opposite end rests upon the inner surface of the end wall of the wall member 53d. In order to maintain the parts of the assembly 53 in assembled relationship and to close the opening through the inner end of the wall member 53d, an annular element 53e is rigidly mounted upon the inner end of the plunger.

As indicated above, the portable radio set 13 may be mounted upon any one of a number of supporting structures or brackets 43 for the purpose of charging the storage batteries provided therein. To this end, the brackets are individually provided in different vehicles, or are otherwise associated with different sources of current, and are identically constructed and arranged. Moreover, each complete radio set such, for example, as the illustrated set 13, is provided with a pair of mounting lugs 57 which are in axial alignment and project from opposite sides of the housing 44. These lugs, as provided in the illustrated set 13, are rigidly mounted upon the side walls of the housing 44, and in order to insure rigidity of the assembled sector, they may conveniently take the form of extended ends of a rod which projects transversely between the side walls of the housing 44 through the chamber between the sub-panel 48 and the bottom wall 44a.

Briefly considered, the supporting structure or bracket 43 comprises a supporting wall 43a having side flanges 43b and 43c projecting outwardly from the side edges thereof. The supporting wall 43a of the bracket may be conveniently clamped to a supporting panel 8 of a vehicle or other supporting structure by means of clamping bolts 9, thereby to provide a rigid support for a set 13 mounted upon the bracket. The side flanges 43b and 43c of the bracket are respectively provided with inwardly extending openings or recesses 58a and 58b which are adapted to receive the mounting lugs 57 of a portable radio set 13 when the set is so positioned upon the bracket that the side flanges 43b and 43c thereof embrace the side walls of the set housing. In order to retain the mounting lugs 57 of a supported set 13 within the recesses 58a and 58b, and for the additional purpose of forcing the unit into its supported position, combination actuating and locking levers 59 and 60 are pivotally mounted upon the side flanges 43b and 43c at points adjacent the recesses 58a and 58b, respectively, by means of the mounting pins 61 and 62. These levers are respectively provided with handle portions 59a and 60a and with camming end portions 59b and 60b which are adapted to be brought into camming engagement with the lugs 57 of a radio set 13 when the set is properly positioned relative to the bracket 43. For the purpose of maintaining the lever 59 in the position to which it is last operated, there is provided an over center spring 63 which is anchored at one end to the side flange 53b and at its opposite end midway along the lever 59. A similar over center spring 64, suitably connected between the lever 60 and the side flange 43c, is provided for retaining the lever 60 in either its operated position or its retracted position. The required connections between the translating circuit 12 of a radio set and the source of current associated with the bracket 43 are made through the jack pin receiving contacts 16a, 16b, 16c and 16d of a female connector 16 which is mounted upon the supporting wall 43a of the bracket 43 by means of mounting screws or bolts 65. It will be understood in this regard that each portable radio set 13 is provided with a male connector 17 which is so disposed along the bottom wall 44a of the housing 44 therefor that the contacts thereof may engage the enumerated contacts of the connector 16 through an opening provided in the bottom wall 44a of the set when the set is properly positioned upon the bracket 43. In order to effect disengagement of a radio set 13 from the supporting bracket 43 after a charging operation has been completed, two sets of leaf springs 66 and 67 are mounted upon the front side of the supporting wall 43a just inside of the side flanges 43b and 43c. These spring sets respectively comprise a plurality of bowed leaf springs which are anchored at the respective centers thereof to the front side of the supporting wall 43a by means of rivets 68 and 69. As thus arranged, the springs forming the two spring piles 66 and 67 bulge outwardly away from the front surface of the supporting wall 43a on either side of the mounting rivets 68 and 69.

For the purpose of selectively actuating the switching apparatus 35 of a radio set 13 supported upon the illustrated bracket 43 in accordance with the voltage of a direct current source associated with this bracket, a yieldable actuating assembly which comprises the compressible coil spring 70 and the pin 71 is provided. This assembly may be mounted in any one of four positions along the upper edge of the supporting wall 43a, these positions respectively corresponding to the four switches 36, 37, 38 and 39 making up the switching apparatus 35 of a set 13 supported upon the bracket 43. More specifically, the supporting wall 43a is provided at its upper edge with four openings 72, 73, 74 and 75 which are arranged respectively to register with the openings 53a, 54a, 55a and 56a of a set 13 supported upon the bracket 43. The actuating assembly comprising the coil spring 70 and the pin 71 may be mounted upon the wall 43a in any one of the four positions defined by the enumerated four openings 72, 73, 74 ad 75. To this end, the pin 71 is provided with a portion of reduced diameter which is adapted to be inserted through any one of the four openings and is threaded to receive an assembly nut 76. As best shown in Figs. 5 and 6, a lock washer 77 is provided for preventing inadvertent disassembly of the three parts 70, 71 and 76 from the supporting wall 73. It is noted that the coil spring 70, which is telescoped over the pin 71, is suitably anchored to the pin at the end thereof which is adjacent the supporting wall 43a. Otherwise, the coil spring 70 is entirely free for compression when a force is exerted thereon axially therealong.

From the above explanation with reference to the arrangement for supporting the actuating assembly comprising the two elements 70 and 71 in any one of four positions along the top edge of the supporting wall 43a, it will be understood that the particular position in which this assembly is supported will depend upon the voltage of the direct current source associated with the bracket 43. With the arrangement illustrated, the openings 75, 74, 73 and 72 may respectively correspond to direct current sources having voltages of six, twelve, twenty-four and thirty-two volts, respectively. In considering the operation of the translating circuit 12 as provided in the illustrated radio set 13, it may be assumed first that the battery 31 is to be charged through the translating circuit from a source of direct current associated with the illustrated bracket 43. It may be assumed further, that the particular current distribution system 10, 11 or other available source of direct current associated with the bracket 43, has an operating voltage of 32 volts, such that the actuating assembly comprising the three elements 70, 71 and 75 is supported at the opening 72 of the supporting wall 43a. In this regard, it will be understood that the positive and negative terminals of the current source are respectively connected to the contacts 16a and 16b of the connector 16, and that the two other terminals 16c and 16d of this connector are open circuited.

With the above remarks in mind it will be apparent that after the set is correctly positioned relative to the supporting bracket 43 with the bottom wall 44a thereof facing the supporting wall 43a and as the set 43 is moved toward the supporting wall 43a, the jack pins 17a, 17b, 17c and 17d of the male connector 17 enter the contact 16a, 16b, 16c and 16d, respectively of the female connector provided on the bracket 43. Also incident to the movement of the set toward the supporting wall 43a of the bracket 43, the lugs 57 projecting from the side walls of the housing 47 enter the recesses 58a and 58b provided in the side flanges 43b and 43c of the bracket, and the projecting end of the coil spring 70 is brought into engagement with the exposed end of the plunger 53b. As movement of the set 13 toward the supporting wall 43a continues, the housing wall 44a is brought to bear against the leaf springs 66 and 67. Also incident to such continued movement of the set toward the supporting wall 43a, the coil springs 70 and 53f are both compressed, with the result that the plunger 53b is moved inward to actuate the arm 36d of the switch 36 toward its operated position and the pin 71 is brought to bear against the end of the plunger 53b. During final movement of the set toward the supporting wall 43a and after the pin 71 engages the end of the plunger 53b, the coil spring 70 is substantially fully compressed and the plunger 53b is directly actuated to move the switch actuating arm 36d into its operated position wherein the movable contact members 36a, 36b, and 36c of the switch 36 bridge their respective associated stationary contacts. In order to complete the movement of the set toward the supporting wall 43a and to lock the set in its mounted position upon the bracket 43, the levers 59 and 60 are respectively operated from their retracted or normal positions to their operated or off normal positions, as shown in Fig. 2 of the drawings. Incident to the movement of the lever 59 pivotally about its axis 61, the camming end 59b thereof is actuated to engage the associated lug 57 of the set 13, and, due to the camming action produced between the engaged elements 59b and 57 during continued pivotal movement by the handle 59, the set is moved into its final position against the opposing force developed by the springs 70, 66 and 67. When the lever 59 is moved so that the indented portion 59c of the camming end 59b thereof engages the associated lug 57, this lug is locked within the recess 58a. In this regard it will be noted that as the lever 59 is pivoted about the axis pin 61, the spring 63 is swung over the axial center of the axis pin, thereby to retain the lever 59 in its operated position independently of frictional engagement between the camming end 59b of this lever and the associated lug 57. In a manner entirely similar to that just described, the lever 60 may be operated from its retracted or normal position to its operated position for the purpose of latching the other lug 57 of the unit 42 within the recess 58b.

As the contacts 17a and 17b of the connector 17 engage the contacts 16a and 16b of the connector 16, and as the switch 36 is operated to its closed circuit position, all in the manner explained above, a circuit is established for energizing the operating winding 25a of the vibratory relay 25, this circuit extending from the positive terminal of the source 10, 11 by way of the engaged contacts 16a and 17a, the vibratory armature 25b, the winding 25a, the movable contact element 36c and its associated engaged contacts, the resistor 40, the movable contact element 36b, the lower half of the primary winding 21, the choke coil 29 and the engaged connector contacts 17b and 16b to the negative terminal of the source 10, 11. When the operating winding 25a of the relay 25 is thus energized, the weighted armature 25b is attracted to a position wherein it engages the stationary contact 25d. When the weighted armature 25b is operated into engagement with the stationary contact 25d, a path including the resistor 40 and the movable contact element 36c is completed for short-circuiting the operating winding 25a of the relay 25. Also incident to the engagement of the weighted armature 25b with the stationary contact 25d, a circuit is completed for fully energizing the lower half of the transformer primary winding 21, this circuit extending from the positive terminal of the source 10, 11 by way of the engaged contacts 16a and 17a, the armature 25b, the stationary contact 25d, the movable contact element 36b, the lower half of the winding 21, the choke coil 29 and the engaged contacts 17b and 16b to the negative terminal of the source 10, 11.

When the driving winding 25a of the relay 25 is short-circuited in the manner just explained, the armature 25b thereof is released and swings through its normal position to a position wherein it engages the stationary contact 25c and is disengaged from the stationary contact 25d. Incident to the disengagement of the armature 25b from the stationary contact 25d, the above-traced circuit for energizing the winding 25a is recompleted and the current for energizing the lower half of the transformer primary winding 21 is broken. Incident to the engagement of the armature 25b with the stationary contact 25c, a circuit is completed for energizing the upper half of the primary winding 21 from the current source 10, 11. This circuit as traced in the direction of current flow thereover, extends from the positive terminal of the source 10, 11 by way of the connected contacts 16a and 17a, the weighted armature 25b, the contact 25c, the movable contact element 36a and the stationary contacts bridged thereby, the upper half of the primary winding 21, the choke coil 29 and the engaged connector contacts 17b and 16b to the negative terminal of the current source 10, 11. Shortly after the armature 25b engages the contact 25c, it is disengaged from the contact and moved back into engagement with the contact 25d under the influence of the attractive force exerted thereon by the magnet 25a. Incident to the disengagement of the circuit elements 25b and 25c, the upper half of the primary winding 21 is deenergized.

From this point on, the manner in which the relay 25 functions alternately and periodically to transmit current through the two halves of the primary winding 21 is exactly the same as explained above. From a consideration of the above traced circuits, it will be understood that current flows through the two halves of the primary winding 21 in opposite directions during the alternate periods when the circuits for energizing these winding halves are completed. Accordingly, alternating voltage is induced in the secondary winding 22 through the inductive coupling between this winding and the primary winding 21. During continued operation of the translating circuit 12, and each time the potential of the upper terminal of the secondary winding 22 becomes negative with respect to the center tap 22c of this winding, current traverses the storage battery 31 in a direction which extends from the positive center tap by way of the contacts of the switch 30, the choke coil 32, the battery 31 and the rectifier element 26 to the upper negative terminal of the winding 22. This current flow occurs only during alternate half cycles of the voltage induced in the secondary winding 22. During the intervening half cycles of this voltage, the rectifier element 26 prevents the voltage developed in the upper half of the secondary winding 22 from causing current flow through the battery 31. Also, during such intervening half cycles of the voltage induced in the secondary winding 22, the center tap of this winding becomes positive with respect to the lower terminal of this winding, so that current traverses the battery 31 over a circuit and in a direction which extends from the positive midpoint 22c of the winding 22 by way of the contacts of the switch 30, the choke coil 32, the battery 31 and the rectifier element 27 to the lower negative terminal of the winding 22. Here again, it will be understood that during alternate half cycles of the voltage induced in the winding 22, the rectifier element 27 prevents the portion of this voltage developed in the lower half of the secondary winding 22 from causing current flow through the battery 31.

From the above explanation it will be apparent that during operation of the translating circuit 10, current traverses the storage battery 31 in a direction extending from the center tap 22c of the secondary winding 22 to the junction point between the two rectifier elements 26 and 27, and that this polarity of current flow is maintained regardless of the polarity of the voltage impressed across the input terminals 17a and 17b of the circuit. This is true for the reason that the converter provided in the translating channel is equipped with the transformer 20, having the function of isolating the rectifier circuit from the input terminals 17a and 17b. More specifically, all energy transferred between the input and output sides of the translating circuit is accomplished through the inductive coupling between the primary and secondary windings of the transformer 20, which coupling has the function of abolishing the polarity of the voltage impressed across the input terminals 17a and 17b. Stated in other words, all the rectifier circuit comprising the secondary winding 22 requires in order to maintain current flow in the direction established by the polarities of the rectifiers 26 and 27, is that an alternating voltage be introduced therein. When such a voltage is induced in the winding 22 of this circuit in the manner explained above, for example, the rectifier elements 26 and 27 function to maintain the desired direction of current flow regardless of how the voltage is applied to the winding 21. By virtue of this arrangement, the input terminals 17a and 17b of the translating circuit may be reversely connected to the terminals 16a and 16b of the source 10, 11 without in any way affecting the polarity of current flow through the storage battery 31. This permits the terminals 16a and 16b to be indiscriminately connected to the terminals of the source 10, 11, and insures that a charging current will be delivered to the battery 31, for example, regardless of how the terminals 16a and 16b are connected to the associated current source 10, 11.

After the required charging current has been delivered to the battery 31 in the manner just explained, the set 13 may be removed from the supporting bracket 43 by operating the levers 59 and 60 from their operated positions to their retracted positions, thereby to permit the lugs 57 to be withdrawn from the recesses 58a and 58b. As the two levers 59 and 60 are pivoted to their respective normal positions, the springs 66, 67 and 70 function to force the set 13 away from the supporting wall 43a and thus break the frictional engagement between the contacts 17a, 17b, 17c, and 17d and the mating contacts 16a, 16b, 16c, and 16d of the connector carried by the bracket 43. Accordingly, the set 13 may be easily lifted out of engagement with the bracket 43 after the levers 59 and 60 have been returned to their respective normal positions. As the bottom wall 44a of the housing 44 is moved away from the supporting wall 43a of the bracket 43, thereby to disengage the spring 71 and the pin 70 from the exposed end of the plunger 53b, this plunger is returned to its normal position under the influence of the spring 53f. The spring biased actuating arm 36d of the switch 36 follows the movement of the plunger 53b so that after the plunger has been returned to its normal position the switch 36 occupies its open circuit position.

From the above explanation, it will be understood that if the battery 31 of the illustrated radio set 13 is to be mounted upon a supporting bracket having a 24 volt direct current source associated therewith, the two elements 70 and 71 of the selected bracket will be positioned to engage the plunger 54b of the switch actuating assembly 54 incident to the positioning of the set upon the bracket. In such case, the movable contact elements 37a, 37b, and 37c of the switch 37 are moved to engage their respective associated stationary contacts in response to the operation of the switch actuating arm 37d to its off-normal position. With the switch 37 thus operated, the primary winding sections 21a and 21b of equal numbers of turns are excluded from the available circuits for energizing the respective upper and lower halves of the primary winding 21, and the current limiting resistor 41 is included in the above-traced circuit for energizing the operating winding 25a of the vibratory relay 25. The purpose of thus excluding the two primary winding sections 21a and 21b from the described circuits is that of increasing the turn ratio between the primary and secondary windings of the transformer 20, whereby the output voltage of the translating circuit 12 is maintained at the same predetermined value regardless of the fact that this circuit is being energized from a current source of lower voltage. The purpose of including the resistor 41 in the circuit for energizing the winding 25a of the relay 25 in lieu of the resistor 40, is that of insuring that this winding will be energized by a current of the required value to maintain the operation of the relay without causing overheating of the relay winding. In this regard it is pointed out that the resistance values of the two resistors 40 and 41 are so proportioned that the current flow through the winding 25a is below the allowable maximum when this winding is energized over the available circuits from current sources having voltages of 32 and 24 volts, respectively.

If the translating circuit 12 as provided in the illustrated set 13 is to be mounted upon a supporting bracket 43 associated with a 12 volt direct current source, the assembly 70, 71 of the bracket will, for the reasons explained above, be positioned to operate the plunger 55b of the switch actuating assembly 55 incident to the positioning of the set upon the mounting bracket. As the plunger 55b is depressed, the switch actuating arm 38d is moved to its off-normal position wherein the movable contact elements 38a, 38b and 38c of the switch 38 engage their respective associated stationary contacts. With the switch 38 thus operated, it will be observed that the two winding sections 21a and 21c are excluded from the circuit for energizing the upper half of the primary winding 21, and that the corresponding winding sections 21b and 21d are likewise excluded from the circuit for energizing the lower half of this winding. Accordingly, the turn ratio between the primary and secondary windings of the transformer 20 is further increased to maintain the same predetermined output voltage across the battery 31. It will also be observed that with the switch 38 operated, the operating winding 25a of the relay 25 is energized in a circuit which includes only the primary winding sections 21h and 21f, all current limiting resistors being excluded therefrom. In this regard, it may be pointed out that the winding 25a of the relay 25 is designed to operate satisfactorily and without overheating when directly energized through appropriate portions of the primary winding 21 either from a 12 volt current source or a 6 volt current source.

As a further example of the manner in which the translating circuit 12 may be selectively controlled, it may be assumed that this circuit as provided in the illustrated radio set 13 is to be mounted upon a supporting bracket 43 having a 6 volt source of direct current associated therewith. In such case, the assembly 70, 71 of the supporting bracket is so positioned that the plunger 56b of the assembly 56 is depressed incident to the positioning of the set upon the supporting bracket. As the plunger 56b is depressed, the switch actuating arm 39d of the switch 39 is operated to its off-normal position wherein the movable contact elements 39a, 39b, and 39c are actuated to engage their respective associated stationary contacts. With the switch 39 operated, only the primary winding sections 21g and 21h are alternately energized during operation of the vibratory relay 25. Thus the turn ratio between the primary and secondary windings of the transformer 20 is further increased in order that the same predetermined output voltage may be obtained during energization of the translating circuit 12 from the available 6 volt source. It will also be noted that with the switch 39 operated, no current limiting resistors are utilized to limit the current traversing the operating winding 25a of the relay 25, this winding being directly energized in series with the primary winding section 21h when the switch 39 is operated.

In the event the translating circuit 12 as provided in the illustrated radio set 13 is to be mounted upon a supporting bracket 43 having a 110 volt, 60 cycle source of alternating current associated therewith, the movable contact element of the switch 28 is actuated to engage the stationary contact 28a. In this case, the actuating assembly 70, 71 is omitted from the structure of the bracket 43 upon which the set is to be mounted. Accordingly, none of the four switches 36, 37, 38, and 39 is operated during the positioning of the set upon the bracket. In this case, the two terminals of the available alternating current source 15 are connected to the jack pins 18c and 18d of the connector 18, for example, carried by the mounting bracket. Thus, as the unit 42 is positioned upon the bracket a circuit including the engaged connector contacts 18c, 18d, 17c and 17d and the engaged contacts of the switch 28, is completed for energizing a section of the tertiary or buffer winding 23. The current traversing the encircuited portion of the winding 23 causes an induced alternating voltage to be developed in the winding 22. Full wave rectification is imparted to the resulting current flow through the storage battery 31 due to the action of the two rectifying elements 26 and 27, which occurs in the exact manner explained above. In this regard it is pointed out that the turn ratio between the encircuited section of the winding 23 and the winding 22 is so proportioned that the same predetermined output voltage is obtained across the terminals of the battery 31. It will be apparent that with all of the four switches 36 to 39, inclusive, occupying their respective open circuit positions, the various terminals of the different winding sections of the primary winding 21 are open circuited so that the voltage developed across any portion of this winding is effectively isolated from all parts of the vibratory relay 25. Thus, any high voltage developed across any section of the winding 21 is prevented from damaging the operating winding and the contacts of the relay 25.

In the event the translating circuit 12 is to be energized from a 60 cycle alternating current source having a higher voltage of 220 volts, for example, the movable contact element of the manually operable switch 28 is actuated to engage the stationary contact 28b whereby all portions of the winding 23 are energized when the set 13 is positioned upon the supporting bracket associated with the current source. Thus, the turn ratio between the two windings 23 and 22 is reduced in order to compensate for the higher voltage at which the translating circuit 12 is energized, thereby to maintain the same predetermined output voltage from the translating circuit. If desired, those supporting brackets which are associated with alternating current sources, may be suitably labeled as to the voltages of the respective associated sources, in order that the switches 28 of the radio sets which are to be mounted thereon may be appropriately adjusted.

From the foregoing explanation it will be understood that by utilizing the above described arrangement for selectively controlling the translating circuit 12, this circuit may be automatically adjusted to produce the same predetermined output voltage when the set 13 in which it is provided is mounted upon any one of a large number of mounting brackets 43 having current sources of different characters and different voltages respectively associated therewith. It will also be understood that the only operations required to start a charging operation are the simple acts of positioning the set 13 upon any one of the number of supporting brackets 43 and actuating the levers 59 and 60 of the selected bracket to their respective operated or off-normal positions. All required circuit connections are automatically established without any theoretical consideration or knowledge on the part of the person mounting the set upon a selected supporting bracket. It will also be understood that although the invention has been described with particular reference to its use in supplying charging current to the storage battery of a portable radio set from any one of a number of current sources of different characters and different voltages, it may also be used in any application where a direct voltage of constant value is to be derived selectively from any one of a number of current sources of different character and voltages. In this respect the invention is particularly applicable for use in any portable electrical device which is equipped with energy consuming elements designed to operate at a fixed predetermined voltage.

While one embodiment of the invention has been described, it will be understood that various modifications may be made therein, which are within the true spirit and scope of the invention.

I claim:

1. In combination with a supporting structure having a projecting part which may be disposed in any one of a plurality of different predetermined positions, a portable electrical device comprising switching means having a number of settings which respectively correspond to the different positions in which said part may be disposed, means adapted to coact with said part incident to the positioning of said device on said structure for imparting a setting to said switching means which corresponds to the position of said part.

2. In combination with a supporting structure having a projecting part which may be disposed in any one of a plurality of different predetermined positions, a portable electrical device comprising switching means having a number of settings which respectively correspond to the different positions in which said part may be disposed, means adapted to coact with said part incident to the positioning of said device on said structure for imparting a setting to said switching means which corresponds to the position of said part, and a translating circuit controlled by said switching means for energization from a current source having any one of a plurality of different voltages respectively corresponding to the different settings which may be imparted to said switching means.

3. In combination with a supporting structure having a yielding element supported thereon, a portable electrical device adapted to be supported upon said structure and including a housing provided within an opening in one wall thereof which is adapted to receive said element as the device is placed on said structure, a wall portion defining a well which extends inwardly from said housing and covers said opening, a spring biased plunger disposed in said well to be actuated by said yielding element as said device is placed on said supporting structure, and circuit switching means operative in response to actuation of said plunger.

4. In combination with a supporting structure having a yielding element mounted thereon in any one of a plurality of different positions, a portable electrical device adapted to be supported upon said structure and including a housing provided with openings in one wall thereof which respectively correspond to the different positions in which said element may be supported upon said supporting structure, each of said openings being adapted to receive said element when said element is mounted in a particular one of said positions which is different from the other positions, wall portions defining wells which extend inwardly from said housing and respectively cover said openings, spring biased plungers disposed in said wells to be actuated when engaged by said yielding element as said device is placed on said supporting structure, and switching means operative to different settings in response to actuation of different ones of said plungers.

5. In combination with a portable electric device which includes lugs extending outwardly from opposite sides of the housing therefor, a supporting structure comprising a bracket provided with side flanges having recesses for receiving said lugs, camming elements carried by said flanges and operative to engage said lugs when said device is placed on said bracket, spring means carried by said bracket to be engaged by said device as said device is placed on said bracket and operative to disengage said device from said bracket when said camming elements are moved to disengage said lugs, and a switch actuating part carried by said bracket and adapted to engage a switch actuating part carried by said device.

6. A supporting bracket comprising a supporting wall provided with side flanges having recesses for receiving the supporting lugs of a portable electrical device, camming elements carried by said flanges and operative to engage the supporting lugs of a device placed thereon, spring means carried by said supporting wall to yieldingly engage the adjacent wall of a device placed on said bracket, a switch actuating part, and means for mounting said part on said supporting wall in any one of a plurality of positions.

7. In combination a portable electrical device and a supporting structure therefor, said supporting structure including electrical contacts adapted to be connected to a current source of any one of a plurality of predetermined voltages and a projecting part which may be disposed in any one of a plurality of predetermined positions corresponding to said predetermined voltages, said electrical device including a translating circuit adapted for energization from a source of any one of said predetermined voltages, and switching means having different settings individually corresponding to said voltages and operative selectively to control said circuit so that the output voltage thereof is the same when said circuit is energized from a source of any one of said voltages, said translating circuit including contacts adapted to engage the contacts on said supporting structure incident to the positioning of said device on said supporting structure for connecting said translating circuit to the current source connected to said supporting structure, and said switching means including movable parts adapted to coact with said projecting part of said structure incident to the positioning of said device on said structure for imparting the setting to said switching means which corresponds to the voltage of the current source connected to said supporting structure.

8. In combination a portable electrical device and a supporting structure therefor, said supporting structure including electrical contacts adapted to be connected to a current source of any one of a plurality of predetermined voltages and a projecting part which may be disposed in any one of a plurality of predetermined positions corresponding to said predetermined voltages, said electrical device including a translating circuit adapted for energization from a source of any one of said predetermined voltages and including means for producing an output voltage of a predetermined polarity regardless of the polarity of the voltage applied thereto, and switching means having different settings individually corresponding to said voltages and operative selectively to control said circuit so that the output voltage thereof is the same when said circuit is energized from a source of any one of said voltages, said translating circuit including contacts adapted to engage the contacts on said supporting structure incident to the positioning of said device on said supporting structure for connecting said translating circuit to the current source connected to said supporting structure, and said switching means including portions adapted to coact with said projecting part of said structure incident to the positioning of said device on said structure for imparting the setting to said switching means which corresponds to the voltage of the current source connected to said supporting structure.

9. In combination a portable electrical device and a supporting structure therefor, said supporting structure including electrical contacts adapted to be connected to a current source of any one of a plurality of predetermined voltages and a projecting part which may be disposed in any one of a plurality of predetermined positions corresponding to said predetermined voltages, said electrical device including a translating circuit adapted for energization from a source of any one of said predetermined voltages, a plurality of movable parts respectively disposed to be actuated by the differently disposed projecting parts incident to the positioning of said device on said structure, and switching means selectively controlled by said movable parts to condition said circuit for energization from the current source connected to said supporting structure.

10. A portable electrical device including a chargeable battery and a circuit arranged to charge said battery from a current source of any one of a plurality of predetermined voltages, a structure for supporting said device and for connecting said circuit to a current source of one of said predetermined voltages, and means comprising coacting parts of said device and said structure for automatically conditioning said circuit for energization from the current source associated with said structure incident to the mounting of said device upon said structure.

DONALD H. MITCHELL.

REFERENCES CITED

The following references are of record in the file of this patent:

UNITED STATES PATENTS

| Number | Name | Date |
| --- | --- | --- |
| 1,706,113 | French | Mar. 19, 1929 |
| 2,020,913 | Schramm | Nov. 12, 1935 |
| 1,950,428 | Young | Mar. 13, 1934 |
| 3,190,317 | Holst | Feb. 13, 1940 |
| 2,227,937 | Koppelmann | Jan. 7, 1941 |
| 2,115,162 | Garstang | Apr. 26, 1938 |
| 2,369,860 | Schroeder | Feb. 20, 1945 |
| 1,996,734 | McNeill | Apr. 2, 1935 |
| 1,482,833 | Averill | Feb. 5, 1924 |
| 1,612,711 | Erikson | Dec. 28, 1926 |
| 1,731,973 | Fischer | Oct. 15, 1929 |
| 1,958,901 | Schamm | May 15, 1934 |
| 1,176,316 | Rickets | Mar. 21, 1916 |
| 2,280,465 | Barrett, Jr., et al. | Apr. 21, 1942 |